May 1, 1962 W. RIELÄNDER 3,032,167
SHIFTING DEVICE FOR TYPEWRITERS
Filed March 30, 1959 3 Sheets-Sheet 1
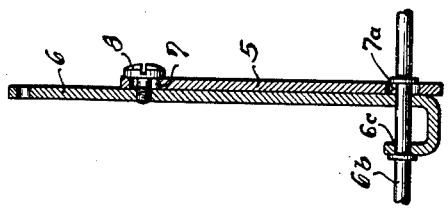
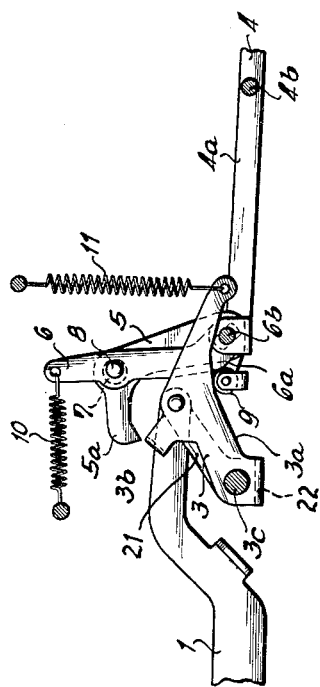
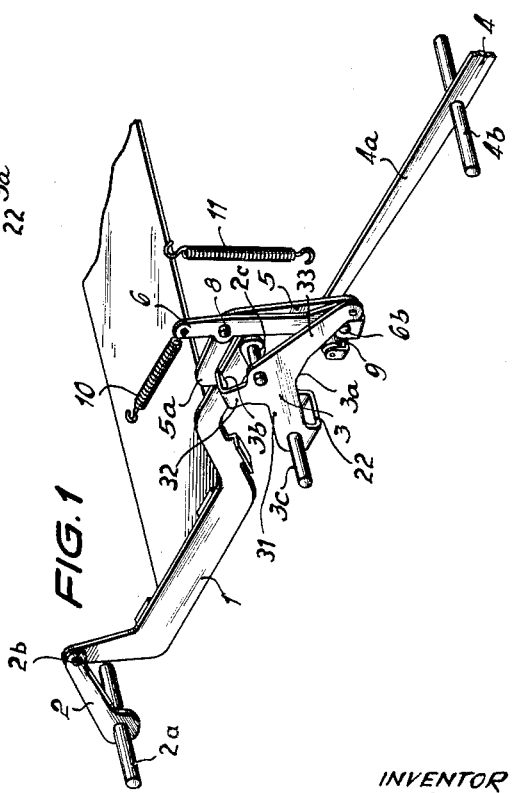
INVENTOR
Werner Rieländer
by: Michael S. Striker
Attorney

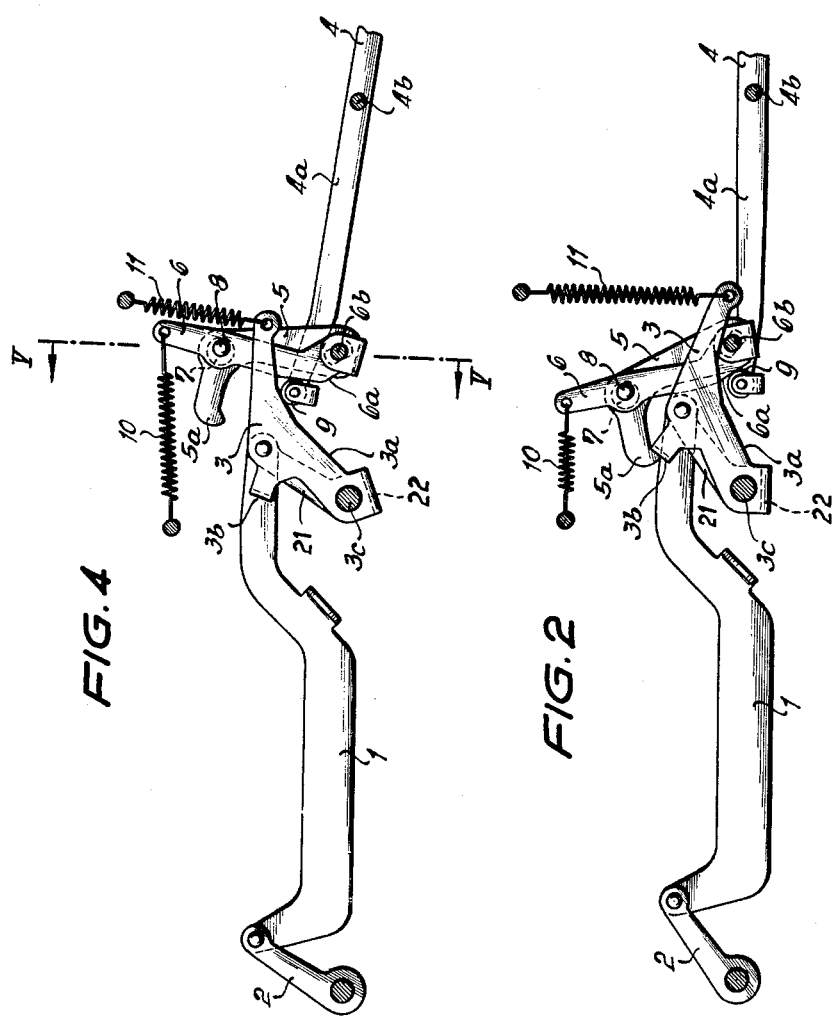

May 1, 1962 W. RIELÄNDER 3,032,167
SHIFTING DEVICE FOR TYPEWRITERS

Filed March 30, 1959 3 Sheets-Sheet 3

INVENTOR
Werner Rieländer by: Michael S. Striker
Attorney

United States Patent Office 3,032,167
Patented May 1, 1962

3,032,167
SHIFTING DEVICE FOR TYPEWRITERS
Werner Rieländer, Wilhelmshaven, Germany, assignor to Olympia Werke A.G., Wilhelmshaven, Germany
Filed Mar. 30, 1959, Ser. No. 803,009
Claims priority, application Germany Apr. 2, 1958
15 Claims. (Cl. 197—73)

The present invention relates to a shifting device for typewriters, and more particularly to a shifting device for shifting a typewriter carriage between two positions respectively associated with lower case characters and upper case characters, and including locking means for locking the device in the normal position of the carriage. Known shifting devices of this type require considerable space, which is particularly undesired for devices used in compactly built typewriters.

It is one object of the present invention to overcome disadvantages of known shifting devices of this type, and to provide a shifting device which is normally locked so that the carriage cannot be accidentally displaced from its normal position in which, for example, lower case characters are typed.

Another object of the present invention is the provision of a shifting device for the typewriter carriage which assures exactly aligned imprints of the lower cast characters and upper case characters.

Another object of the present invention is to provide locking means for a shifting device for typewriter carriages which operate substantially without play.

Another object of the present invention is to provide a normally locked shifting device for a typewriter carriage, which upon operation of a shift key is first unlocked and then shifts the carriage to its other position.

A further object of the present invention is to provide adjustable locking means for the shifting device, so that the locking means can be adjusted when the respective parts are worn, and the required position of the carriage means can be accurately maintained.

With these objects in view, the present invention mainly comprises support means shiftable between a normal position associated with lower case characters and a shifted position associated with upper case characters; locking means for locking the support means in the normal position thereof; and operating means operatively connected to the support means and to the locking means and being movable to successively release the locking means and shift the support means from the normal position to the shifted position.

In the preferred embodiment of the present invention the support means include a movable member having a cam portion, and the locking means include another movable member also having a cam portion. The operating means include an operating member which first engages the cam portion of the locking means, and then engages the cam portion of the support means for shifting the support means out of its normal position in which it was previously locked by the locking means.

The movable member of the locking means preferably comprises a locking member and a cam member which are adjustably fixed to each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary perspective view illustrating a preferred embodiment of the present invention;

FIG. 2 is a fragmentary side view illustrating the device in its normal position;

FIG. 3 is a fragmentary side view of the device illustrating another operational position;

FIG. 4 is a fragmentary side view of the device illustrating a further operational position;

FIG. 5 is a longitudinal sectional view of a part of the locking means illustrating the adjustable connection between two members.

Figure 6:
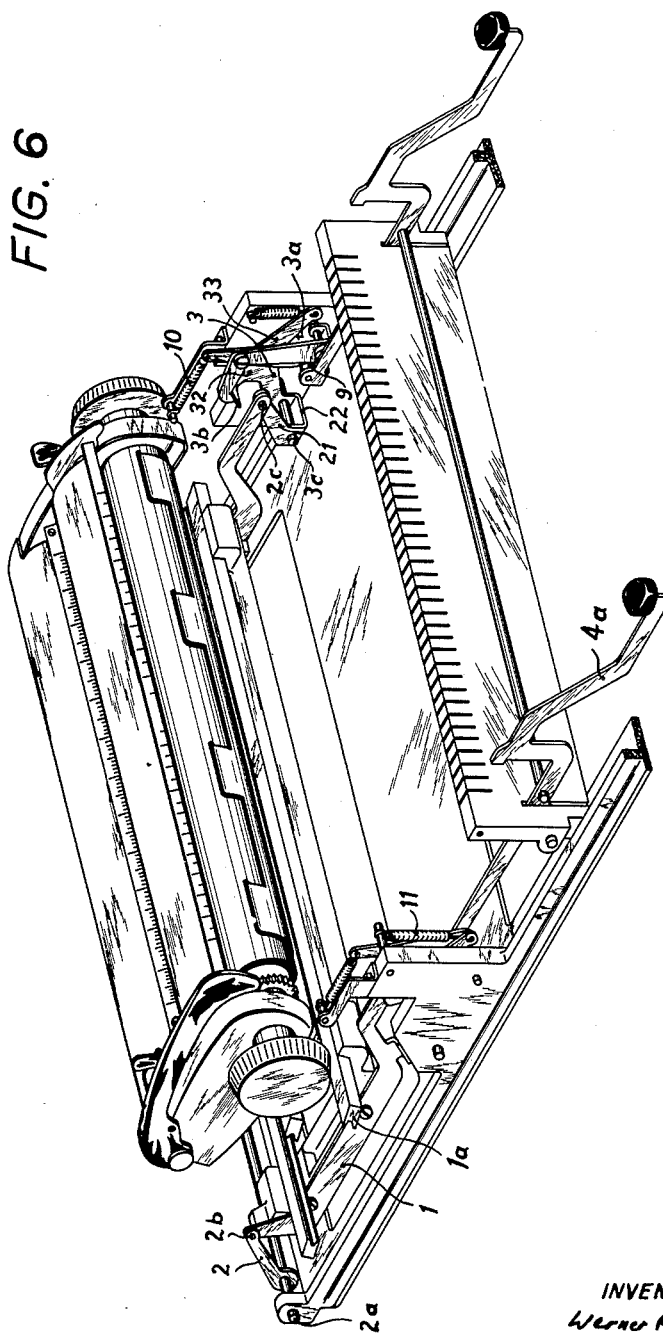
FIG. 6 is a general view illustrating the shifting device of the present invention.

Referring now to the drawings, a pair of support members 1 is secured to the ends of a carriage bed 1a for moving a carriage mounted thereon between two positions in which lower case characters and upper case characters, respectively, are typed in a predetermined position. Only one supporting member is shown in FIG. 1.

Each supporting member 1 is articulated by pins 2b and 2c to a pair of arms 2 and 21. Arm 21 is connected by portion 22 to the arm 31 of an arm member 3 which is also articulated to pin 2c. Arms 31 and 21 are supported on a shaft 3c, and arm 2 is supported on a shaft 2a. Arms 2, 21 are parallel, so that the supporting means 1, 2 and 21 move the carriage bed 1a in a parallel movement.

Arm member 3 has a second arm 32 having a transversely projecting locking portion 3b at the end thereof. The third arm 33 of arm member 3 has a cam portion 3a which cooperates with a cam follower roller 9 at the end of a lever arm 4a which is part of a key lever means 4 pivotally mounted on a shaft 4b.

Locking means are provided for releasably locking the supporting means in the normal position shown in FIG. 1, and include a locking member 5 and a cam member 6 adjustably fixed to locking member 5. Locking member 5 has a locking hook 5a which normally engages locking portion 3b so that the supporting means are locked. When locking member 5 is turned together with cam member 6 to the position shown in FIG. 3, the locking portion 3b is released permitting turning of members 3, 21 and 2 together with supporting member 1. Cam member 6 has a portion 6a located in the path of movement of cam follower 9.

As shown in FIG. 5, locking member 5 has two openings 7 and 7a. A shaft 6b passes through opening 7a, and also through bores 6c in cam member 6 so that cam member 6 is supported for turning movement. A screw 8 passes through the opening 7 and is threaded into a bore of cam member 6. When screw 8 is loosened, cam member 6 and locking member 5 can be displaced relative to each other in at least two perpendicular directions, which is possible since the stem of screw 8 and shaft 6b have substantially smaller diameters than the associated openings 7 and 7a in locking member 5. In this manner, it is possible to fix cam member 6 to locking member 5 in a position in which cam follower 9 is properly located with respect to the cam portion 6a, while the locking hook 5a is in locking engagement with the locking portion 3b.

Openings 7 and 7a have diameters at least twice as great as the diameters of screw 8 and shaft 6b, and the contacting surfaces of members 5 and 6 are roughened to prevent relative shifting of the two members after screw 8 has been tightened.

A spring 10 is secured to a fixed point on the frame of the machine, and also to cam member 6 to urge locking member 5 to the locking position shown in FIG. 1. Another spring 11 is secured to arm 33 of member 3, to compensate for part of the weight acting thereon so that the forces required for shifting supporting members 1 with the carriage bed 1a are reduced.

The device is operated as follows:

When at least one of the coupled key levers 4a is operated, the operating portion of lever 4 with the cam follower roller 9 moves in a circle about shaft 4b from its normal position to an intermediate position, while cam follower 9 urges cam member 6 and thereby locking member 5a to turn from the normal locking position shown in FIG. 2 to the releasing position shown in FIG. 3 in which the locking portion 3b is released.

During the following turning movement of the operating lever 4, cam follower 9 passes from cam portion 6a to cam portion 3a of arm member 3, and while operating lever 4 is further turned, the cam follower 9, moving along cam portion 3a, shifts arm member 3 together with arm 21, supporting member 1, and arm member 2 to the position shown in FIG. 4 in which the carriage bed 1a is shifted, and the carriage correspondingly displaced to produce imprints of the upper case characters instead of the lower case characters.

During this operation, the weight of the carriage bed 1a and of the carriage is partly counterbalanced by springs 11 and the connected members 5 and 6 turn in clockwise direction against the action of springs 10, while the arm member 3 turns in counterclockwise direction.

When the key of the respective key lever 4 is released, the weight of the carriage bed 1a with the carriage thereon effects movement of the supporting means 1, 2, and 21 together with arm member 3 to the normal position of the device. Spring 10 retracts cam member 6 together with locking member 5, so that the locking portion 5a again engages the locking portion 3b, and locks the device in its normal position.

From the above description of a preferred embodiment of the present invention, it will become apparent that operating means 4, 9 are operatively connected to the support means 1, 2, 21 and to the locking means 5, 6 for first releasing the locking means and then shifting the support means from the normal position shown in FIGS. 1 and 2 to the shifted position shown in FIG. 4.

The construction of the device of the present invention reliably locks the carriage supporting bed in its normal position so that the carriage cannot be accidentally displaced from its normal position by shocks or vibrations. Furthermore, the arrangement requires very little space, and a small force on the operator influenced operating means 4 for shifting the carriage bed with the carriage.

It will be understood that each of the elements described above, or two or more together, may also find a useful application in other types of shifting devices differing from the types described above.

While the invention has been illustrated and described as embodied in a shifting device for a typewriter carriage means and including locking means for locking the device in its normal position, it is not intended to be limited to the details shown since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a typewriter, in combination, support means shiftable between a normal position and a shifted position, said support means including a movable member having a cam portion; locking means for locking said support means in said normal position and including another movable member having a cam portion and being movable between a normal position in which said locking means locks said support means, and a releasing position for releasing said locking means; and operating means including an operating member having a single cam follower surface and being movable from a normal position to an intermediate position while said cam follower surface engages said cam portion of said other movable member for moving the same from said normal position to said releasing position, and being movable to a terminal position while said cam follower surface engages said cam portion of said movable member of said support means for moving said support means from said normal position to said shifted position.

2. In a typewriter, in combination, support means shiftable between a normal position and a shifted position respectively associated with lower case characters and upper case characters and adapted to support a carriage means, said support means including a movable member having a cam portion; locking means for locking said support means in said normal position and including another movable member having a cam portion and being movable between a normal position in which said locking means locks said support means, and a releasing position for releasing said locking means; and manually operated operating means including an operating member having a cam follower roller and being movable from a normal position to an intermediate position while said cam follower roller engages said cam portion of said other movable member for moving the same from said normal position to said releasing position, and being movable to a terminal position while said cam follower roller engages said cam portion of said movable member of said support means for moving said support means from said normal position to said shifted position.

3. In a typewriter, in combination, support means shiftable between a normal position and a shifted position, said support means including a movable member having a cam portion; locking means for locking said support means in said normal position and including a locking member, and a cam member adjustably secured to said locking member and being movable with the same between a normal position in which said locking member locks said support means, and a releasing position for releasing said locking means; and operating means including an operating member movable from a normal position to an intermediate position while engaging said cam member for moving the same and said locking member from said normal position to said releasing position, and being movable from said intermediate position to a terminal position while engaging said cam portion of said movable member of said support means for moving said support means from said normal position to said shifted position.

4. In a typewriter, in combination, support means shiftable between a normal position and a shifted position, said support means including a movable member having a cam portion; locking means for locking said support means in said normal position and including a locking member, and a cam member adjustably secured to said locking member and being movable with the same between a normal position in which said locking member locks said support means, and a releasing position for releasing said locking means, said locking member and said cam member being movable relative to each other in two perpendicular directions during adjustment; means for fixedly securing said cam member and said locking means in adjusted positions to each other; and operating means including an operating member movable from a normal position to an intermediate position while engaging said cam member for moving the same and said locking member from said normal position to said releasing position, and being movable from said intermediate position to a terminal position while engaging said cam portion of said movable member of said support means for moving said support means from said normal position to said shifted position.

5. The combination set forth in claim 4 wherein said locking member is formed with at least one opening, wherein said cam member is formed with a threaded bore opening into said opening and having a smaller diameter than the same, and wherein said means for fixedly securing is a threaded means passing through said opening and threadedly engaging said threaded bore.

6. An arrangement as set forth in claim 4, and including spring means connected to said locking means for urging said locking member into said locking position.

7. In a typewriter, in combination, shiftable support means including a support member adapted to support carriage means, and a pair of arm members articulated to the ends of said support member and being supported for turning movement about parallel axes, one of said arm members having a cam portion, and a locking portion, said support means being shiftable between a normal position and a shifted position respectively associated with lower case characters and upper case characters; locking means for locking said support means in said normal position and including a locking member, and a cam member adjustably fixed to said locking member and being movable with the same between a normal position in which said locking member engages said locking portion for locking said support means in said normal position, and a releasing position in which said locking member releases said locking portion, said cam member having a cam portion forming with said first mentioned cam portion a path; and operating means including an operating member having an operating portion, said operating member being movable from a normal position to an intermediate position while said operating portion engages said cam portion of said cam member for moving the same with said locking member from said normal position to said releasing position, said operating member being further movable from said intermediate position to a terminal position while said operating portion moves further along said path and engages said cam portion of said one arm member for moving said support means from said normal position to said shifted position.

8. In a typewriter, in combination, shiftable support means including a support member adapted to support carriage means, and a pair of arm members articulated to the ends of said support member and being supported for turning movement about parallel axes, one of said arm members having a cam portion, and a locking portion, said support means being shiftable between a normal position and a shifted position respectively associated with lower case characters and upper case characters; spring means for urging said support means into said normal position; locking means for locking said support means in said normal position and including a locking member, and a cam member adjustably fixed to said locking member and being movable with the same between a normal position in which said locking member engages said locking portion for locking said support means in said normal position, and a releasing position in which said locking member releases said locking portion, said cam member having a cam portion forming with said first mentioned cam portion a path; resilient means connected to said locking means for urging said locking member into said locking position; and operating means including an operating member having an operating portion, said operating member being movable from a normal position to an intermediate position while said operating portion engages said cam portion of said cam member for moving the same with said locking member from said normal position to said releasing position, said operating member being further movable from said intermediate position to a terminal position while said operating portion moves further along said path and engages said cam portion of said one arm member for moving said support means from said normal position to said shifted position.

9. An arrangement as set forth in claim 8 wherein said locking portion is a projecting part transversely projecting from said one arm member in the direction of the axis of the same.

10. In a typewriter, in combination, shiftable support means including a support member adapted to support carriage means, and a pair of arm members articulated to the ends of said support member and being supported for turning movement about parallel axes, one of said arm members having a cam portion, and a locking portion, said support means being shiftable between a normal position and a shifted position respectively associated with lower case characters and upper case characters; locking means for locking said support means in said normal position and including a locking member, and a cam member adjustably fixed to said locking member and being movable with the same between a normal position in which said locking member engages said locking portion for locking said support means in said normal position, and a releasing position in which said locking member releases said locking portion, said cam member having a cam portion forming with said first mentioned cam portion a path; and operating means including an operating key lever having an operating portion, said operating key lever being turnable from a normal position to an intermediate position while said operating portion engages said cam portion of said cam member for moving the same with said locking member from said normal position to said releasing position, said operating key lever being further movable from said intermediate position to a terminal position while said operating portion moves further along said path and engages said cam portion of said one arm member for moving said support means from said normal position to said shifted position.

11. An arrangement as set forth in claim 10 wherein said operating portion of said key lever includes a cam follower roller.

12. In a typewriter, in combination, shiftable support means including a support member adapted to support carriage means, and a pair of arm members articulated to the ends of said support member and being supported for turning movement about parallel axes, one of said arm members having a cam portion, and a locking portion, said support means being shiftable between a normal position and a shifted position respectively associated with lower case characters and upper case characters; locking means for locking said support means in said normal position and including a locking member, a cam member, and means for securing said cam member and said locking member to each other and enabling adjustment of the relative position of said cam member and locking member in two perpendicular directions, said cam member and locking member being together movable between a normal position in which said locking member engages said locking portion for locking said support means in said normal position, and a releasing position in which said locking member releases said locking portion, said cam member having a cam portion forming with said first mentioned cam portion a path; and operating means including an operating member having an operating portion, said operating member being movable from a normal position to an intermediate position while said operating portion engages said cam portion of said cam member for moving the same with said locking member from said normal position to said releasing position, said operating member being further movable from said intermediate position to a terminal position while said operating portion moves further along said path and engages said cam portion of said one arm member for moving said support means from said normal position to said shifted position.

13. An arrangement as set forth in claim 12 and including a shaft turnably supporting said cam member, and wherein said locking member is formed with two openings, said shaft passing through one of said openings and having a diameter smaller than the same, and wherein said cam member has a threaded bore opening into the other opening of said locking member, and wherein said means for securing includes a screw threadedly engaging said threaded bore and passing through said other opening.

14. In a typewriter, in combination, support means shiftable between a normal position and a shifted position, said support means including a movable member; locking means for locking said support means in said normal position and including a first member and a second member superposed on said first member, one of said first and second members having at least one opening, and a releasable clamping means secured to the other member of said first and second members, and having a first portion passing through said opening and a second portion abutting said one member for clamping said first and second members to each other, said first portion having a cross section substantially smaller than the area of said opening so that the relative position of said first and second members can be adjusted while said clamping means is released, said second member being movable with said first member between a normal position in which said first member locks said support means, and a releasing position for releasing said locking means; and operating means including an operating member movable from a normal position to an intermediate position while operatively connected to seaid second member for moving the same and said first member from said normal position to said releasing position, and being movable to a terminal position while operatively connected to said movable member of said support means for moving said support means from said normal position to said shifted position.

15. An arrangement as set forth in claim 14 wherein said movable member of said support means has a cam portion; wherein said second member has a cam portion; and wherein said operating member has a single cam follower surface cooperating with said cam portion of said second member while moving from said normal position to said intermediate position, and cooperating with said cam portion of said movable member of said support means while moving from said intermediate position to said terminal position for first releasing and then shifting said support means.

References Cited in the file of this patent
UNITED STATES PATENTS

| | | |
|---|---|---|
| 691,776 | Kauffman | Jan. 28, 1902 |
| 766,299 | Wagner | Aug. 2, 1904 |
| 2,547,895 | Veltman et al. | Apr. 3, 1951 |